United States Patent

Desbarats

[15] 3,669,212
[45] June 13, 1972

[54] AIR-PROPELLED VEHICLE AND METHOD FOR DRIVING AND STEERING SAID VEHICLE

[72] Inventor: William Edouard Desbarats, 1289 La Salle Street, Baie Comeau, Quebec, Canada

[22] Filed: April 30, 1970

[21] Appl. No.: 33,230

[52] U.S. Cl. ................................................................180/120
[51] Int. Cl. .............................................................B60v 1/14
[58] Field of Search ..........................180/120, 121, 122, 126

[56] References Cited

UNITED STATES PATENTS

| | | | |
|---|---|---|---|
| 3,292,721 | 12/1966 | Dobson | 180/120 |
| 3,401,766 | 9/1968 | Laufman et al. | 180/120 X |
| 3,412,956 | 11/1968 | Cockerell | 180/121 X |
| 3,467,213 | 9/1969 | Walker | 180/120 |

*Primary Examiner*—A. Harry Levy
*Attorney*—Raymond A. Robic

[57] ABSTRACT

An air-propelled vehicle having an air tunnel on either side of the central longitudinal vertical plane of the vehicle and an air thrust source forwardly of the tunnels blowing a jet of air of predetermined magnitude into each of the tunnels. A baffle assembly diverts, for steering, a portion at least of one jet into the other jet whereby to modify the relative magnitudes of the jets.

2 Claims, 4 Drawing Figures

3,669,212

PATENTED JUN 13 1972

INVENTOR
William Edouard DESBARATS

*ATTORNEY*

INVENTOR
William Edouard DESBARATS

ATTORNEY

AIR-PROPELLED VEHICLE AND METHOD FOR DRIVING AND STEERING SAID VEHICLE

The present invention relates to an air-propelled vehicle.

More specifically, the present invention relates to a vehicle of the above-mentioned type provided with a steering system capable of giving adequate and efficient directional stability and control. The steering system of the invention is particularly applicable, although not exclusively, to amphibious vehicles employing the ground effect or air-cushion principle.

There has been, in the past ten years, a substantial and rapid development in the field of air cushion vehicles (ACV) as exemplified by the British "Hovercraft" (SRN 5), the French "Naviplane" and the U.S. Navy PACV (Bell SK-5). The field is also well covered in technical literature.

Small crafts of the ACV type have recently appeared on the market, the crafts being designed for use by one or two passengers. These, as well as the larger ACV's operate with the same following characteristics.

To reduce travelling friction, they are sustended on an air cushion fed by a mechanical fan or blower, the air being blown in a chamber having a peripheral skirt which may be rigid or flexible or rigid but movable. In some crafts, the rear end of the air cushion chamber is closed by movable flaps designed to control the pressure distribution in the chamber so as to control the longitudinal and, in some cases, the lateral position of the craft.

The crafts are propelled by an airscrew in the manner of a conventional aircraft and steering is obtained by means of one or more rudders disposed in the air stream created by the propeller.

In other known vehicles of recent design, the propelling air thrust is obtained by bleeding off the cushioning air in the chamber through an adjustable orifice at the rear end of the vehicle.

In some other designs, steering is by means of conventional rear-mounted air rudders with air being bled from the cushioning chamber and directed against the rudders to produce the desired steering moment.

The above-mentioned vehicles are however subject to numerous major disadvantages.

They lack inherent directional stability which, along with the small forces available for directional thrust, results in poor directional control characteristics and difficulty in using them over sloped terrain.

They require very high power to rise over obstacles and increasing power to sustend them as speed increases.

When the craft is operated over loose ground conditions, such as sand or light snow, the moving parts wear out more rapidly and visibility is reduced due to particles escaping out from under the craft across the entire periphery of the air cushion chamber, the particles being thereafter sucked by the air intake.

Peculiar to small ACV's where thrust and directional forces are obtained through bleeding of the air cushion are the following further disadvantages.

The power available for thrust and direction steering decreases as speed increases.

Due to the small size of the craft, combined with relatively high power requirements for vertical rise and the delicate and vulnerable nature of the skirts and flaps exposed to ground surface irregularities, the small ACV's of this type have very limited ability to rise above obstacles.

The invention is directed to air-propelled vehicles having a body formed with at least one air tunnel extending on either side of the central longitudinal vertical plane of the body, the tunnels being opened at the rear end. An air thrust source is mounted at the front end of the body, upstream of the tunnels, to blow an air thrust jet of predetermined magnitude into each of the tunnels so as to cause displacement of the vehicle and give rise to a resultant reactive drag force acting centrally of the vehicle. Means is provided to modify the magnitudes of the jets in relation to one another to create an active resultant thrust force parallel to and offset from the resultant drag force whereby to apply to the vehicle a steering turning moment.

The modifying means includes pivotable baffle plates that are operable to divert at least a portion of one of the jets into the other jet so as to modify the relative magnitudes therebetween and create the turning moment aforesaid.

It is believed that a better understanding of the invention will be afforded by the description that follows having reference to the appended drawings wherein.

Figure 3:
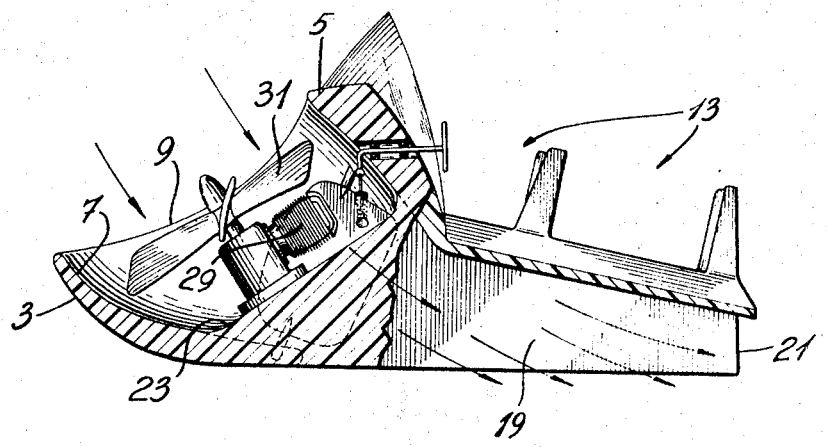
FIG. 3 is a longitudinal vertical cross-section of the vehicle of FIG. 1.

As shown in the drawing, the invention is illustrated as applying to an amphibious ACV having an elongated body 1 the bottom of which is generally straight, curving however upwardly at the front end 3. The deck portion has a bow 5 formed with an upwardly open recess 7, the opening 9 of which is covered with a grate 11, the assembly acting as an air intake. The last mentioned grate 11 has been omitted from FIG. 3.

Figure 1:
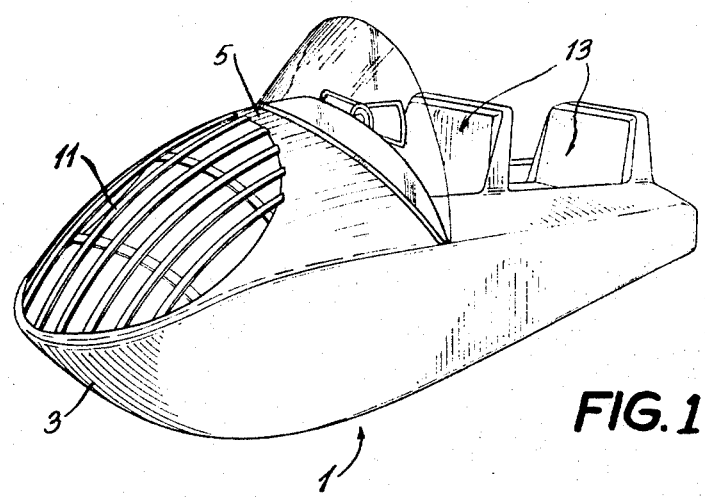
FIG. 1 is an air-propelled vehicle constructed according to the teaching of the invention.

The rear portion of the deck is constructed as a passenger compartment 13 being suitable for receiving two passengers. As will be gathered from a study of FIGS. 1 and 3, the hull of the body 1 is formed of two parallel outer skids 15 and a central skid 17 substantially wider than the outer skids 15 and, in fact, sufficiently wide to be hollowed out to define passenger compartment 13 shown in FIG. 1.

Figure 4:
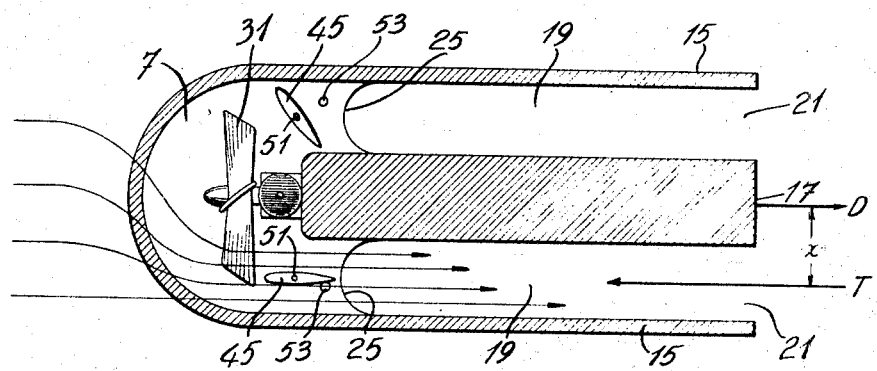
FIG. 4 is a horizontal cross-section intended to illustrate the principle of the invention.

Thus, and as best illustrated in FIG. 4, skids 15 and 17 define two parallel elongated tunnels 19, of equal cross-section, extending on either side of the central longitudinal vertical place of the body 1. Both tunnels are opened at the rear end 21 as well as at the bottom thereof.

Recess 7 has a bottom 23 formed with two side apertures 25 leading into the tunnels 19. Bottom 23 is inclined and a blower, operable by a conventional motor 29 and having an airscrew 31, is securely mounted on the bottom 23, centrally of body 1 at the forward end of the central skid 17. In this manner, the airscrew creates a downwardly inclined slipstream which is equally divided into at least one jet blowing rearwardly in each of the tunnels 19.

From the above description, it will be appreciated that the two jets in tunnels 19 can be considered as being made up of two horizontal components responsible for the air thrust causing horizontal displacement of the vehicle and a vertical thrust responsible for sustaining the vehicle, lifting it slightly from the ground to destroy the usual travelling friction.

In view of the fact that the cross-section of the tunnels 19 are equal throughout their lengths, the magnitudes of the thrust forces in the tunnels will be substantially equal. According to the invention, steering of the vehicle is obtained by modifying the magnitudes of the jets in the tunnels 19 in relation to one another so that an active resultant thrust force, such as force T in FIG. 4, is created which is parallel to and offset from the resultant drag force D acting along the central longitudinal axis of the vehicle. Force D is the resultant of all the aerodynamic and friction drag forces acting on the vehicle and is substantially of the same magnitude as force T. The two forces T and D will now create a turning or steering moment equal to the thrust force T times $x$, where $x$ is the distance between forces T and D.

In the instance illustrated in FIG. 4, all of the slipstream from the blower has been diverted into a single tunnel 19 so that it may be assumed that the thrust force T lies substantially centrally of the corresponding tunnel 19.

Figure 2:
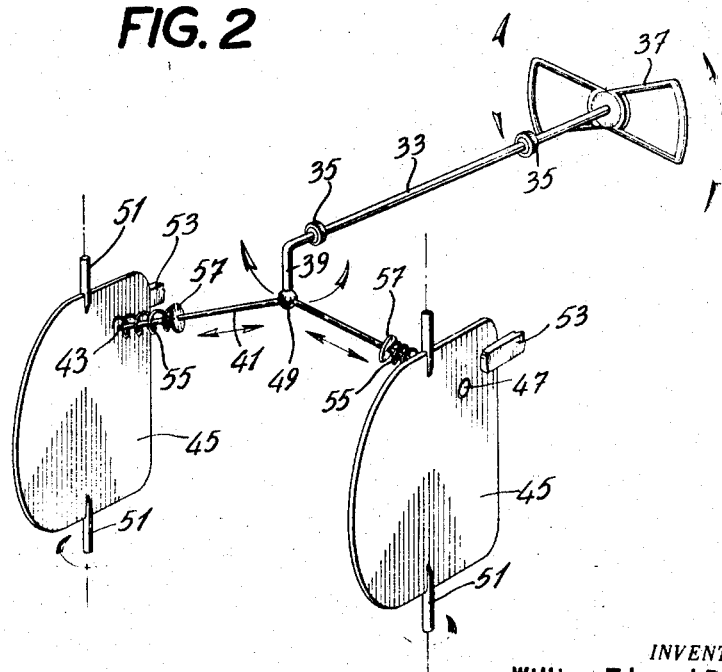
FIG. 2 is a perspective view of the steering assembly for the vehicle of FIG. 1.

According to the invention, the preferred manner of modifying the relative magnitudes of the jets in tunnels 19 is by diverting a portion or all of the flow of one tunnel into the other. This may be obtained by means of the steering assembly illustrated in FIG. 2, which assembly will now be described.

A rotatable steering column 33, journalled in bearings 35, is formed with a bent end 39 acting as a steering arm. Column 33 is rotated by a conventional steering wheel 37.

Tie rods 41 are connected to the lower end of the steering arm 39 through a ball joint 49. The other ends of tie rods 41 extend freely across holes 43 through baffle plates 45 mounted for pivotal movement about vertical axes through pins 51 rotatable in suitable bearings (not shown) in the body 1. The tip of tie rods 41 is formed with enlarged heads 47 preventing withdrawals of tie rods 41 from the respective baffle plates 45.

Abutment members 53 secured to the body 1 are located so as to be abutted by the outer faces of the baffle plates 45. Helical springs 55 mounted around tie rods 41 and pressing, on the one hand, against the inner faces of baffle plates 45 and, on the other hand, against washers 57 fixed to tie rods 41, bias baffle plates 45 against their respective abutment members 53.

From the above description, it will be appreciated that whenever steering wheel 37 is rotated in one direction, swinging of the steering arm 39 will cause one baffle plate 45 to be pressed against its abutment 53, rod 41 slipping freely across the corresponding hole 43 while the other tie rod 41 will bring the corresponding baffle plate 45 into rotation. In this manner, a portion or all of the air jets in the tunnel 19 corresponding to the pivoting baffle plate 45 will be diverted into the tunnel 19 corresponding to the baffle plate 45 held in abutment against its member 53. In FIG. 4, the situation illustrates where all of one jet is being diverted into the other tunnel.

In normal, non-steering condition of travel, baffle plates 45 stand parallel with the central longitudinal vertical plane of the vehicle.

Referring again to FIG. 4, it will be appreciated that the magnitude of the offset thrust force T as well as its distance $x$ from the drag force D will depend on the degree of closure of the upward (in FIG. 4) baffle plate 45.

It will also be appreciated that the longitudinal shape and the cross-section of tunnels 19 may be arranged so as to recuperate a portion of the slipstream velocity pressure losses in the length of the tunnels as static pressure available to provide load carrying and thrust forces. The above described arrangement provides directional stability by confining in tunnels 19 within the vehicle's length the entire slipstream from its air thrust source. The arrangement will provide a sizable momentum equal to the slipstream's mass flow times the slipstream's velocity, which momentum is available to resist sideways motion such as that resulting from loads imposed from without as, for example, wind gusts or minor surface irregularities.

To obtain accurate and strong directional control forces, the slipstream's entire flow is ducted to tunnels 19 in such a way that the flow may be proportioned at will between the tunnels, the flow being decreased in the tunnel lying on the inside of the curve while it is increased in the tunnel on the outside of the turn. The method of the invention thus uses the vehicle's entire power output to provide the required turning moments at will at any operating speed.

Also, although a single air thrust source has been shown as well as only one tunnel on either side of the central longitudinal plane of the vehicle, it will be understood that several thrust sources as well as several tunnels on each side of the central longitudinal plane can be provided.

In the case where a multiple thrust source is used, the combined slipstream from all of the thrust sources may be ducted so that the dampers immediately downstream from the thrust sources divert the combined slipstream in any required proportion from the tunnels on one side to the equivalent tunnels on the other side. These dampers may be operated, as in the embodiment described above, by a mechanical linkage operated by the vehicle's pilot.

Alternatively, the slipstream of each thrust source in a multiple thrust source may be ducted exclusively to one or more tunnels on one side of the vehicle in an arrangement symmetrical about the longitudinal axis of the vehicle. In such a case, the thrust output is decreased on one side and increased on the other side by any of the several methods well-known to those skilled in the art such as by modulating propeller pitch or propeller shaft speed. In cases where differential thrust source output modulation is used instead of dampers, the steering control is connected to either or both differential throttle or pitch control linkages using established multi-engined aircraft technology.

As mentioned previously, the principle is to modify the magnitudes of the air jets in the tunnels 19 relative to one another whereby to create a resultant thrust force offset from the drag force whereby to obtain a steering moment.

Obviously, in the case of an amphibious vehicle, the underside of body 1 is arranged so that sufficiently wide skids 15 running the length of body 1 and curved upwardly at the front end are built in whereby to support the vehicle on solid surfaces and to float it without submerging the tops of tunnels 19 in water. The upward end at the front of the vehicle makes it possible to ride over obstacles since at low speeds the vehicle controlled and steered according to the present invention behaves like a sled on hard surfaces and like a multi-hulled boat on water.

Only as speed increases, does static air pressure begin to provide an appreciable lifting force. This static pressure increase is obtained from two sources as speed increases;

a. as the front source (or sources) reaches its maximum output, the slipstream's velocity pressure losses within tunnels 19 increase, which pressure losses are largely converted to static pressure;

b. the upward curved front end of the vehicle impinges on still air at atmospheric pressure. Since this still air has a velocity relative to the vehicle, part of this still air will exchange part of its relative velocity pressure for static pressure available under the vehicle.

In order to enhance low speed displacement, particularly in the case of larger vehicles, two additions to the basic supporting skids may be resorted to without departing from the spirit of the present invention.

In the first place, where the vehicle is primarily designed for use on solid surfaces, wheels may be mounted partially within the skids and arranged to steer and even to drive the vehicle, using an auxiliary power source or power take-off from the main propulsion engine in the manner of a conventional land-based wheel vehicle.

In the second case, where the vehicle is primarily designed for use on soft surfaces having a high coefficient of friction, high pressure air may be fed through the underside of the skids from an auxiliary blower assembly, the under surfaces of the skids being skirted to retain the air cushion in any of the ways currently known to those skilled in the art.

I claim:

1. An air-cushion and air-propelled vehicle comprising:
   a. a body formed with air tunnels each extending on one side of the central longitudinal vertical plane of said body, said tunnels being opened at the rear end and at the ground-facing bottom thereof;
   b. an air thrust source mounted at the front end of said body, upstream of said tunnels, to blow an air jet of predetermined magnitude into each of said tunnels whereby to cause displacement of said vehicle and to give rise to a resultant reactive drag force acting longitudinally centrally of said vehicle, said air source comprising at least one air blower ejecting an inclined slipstream breaking up into a horizontal thrust-applying component and into a vertical sustension component,
   c. means to modify the magnitudes of said jets in relation to one another to create an active resultant thrust force parallel to and offset from said resultant drag force whereby to apply to said vehicle a steering turning moment, said modifying means including pivotable baffle plates operable to divert at least a portion of one of said jets into the other jets whereby to modify relative magnitudes thereof;

d. means mounting said baffle plates for pivotal action about a vertical axis and between said blower and said tunnels to control the magnitudes of the jets allowed into the respective tunnels, and e. single means operative to cause pivoting of only one of said baffle plates at one time so that a portion or all of one jet may be directed toward the other jet to be mixed therewith.

2. A vehicle as claimed in claim 1, wherein said single means comprises:

a rotatable steering column having a bent end defining a steering arm, said column and arm being located between said baffle plates;

tie rods, each having one end connected to the free end of said steering arm and the other end extending across a hole through one of said baffle plates and from one face thereof; stop means on said other end of each tie rod to prevent withdrawal of said tie rod from the respective baffle plate;

resilient means biassing each baffle plate against the respective stop means, and abutment means for each baffle plate operative on the face thereof opposite said one face;

said abutment means and resilient means being operative to hold said baffle plate in parallel relationship with said central plane in inoperative position of said magnitude-modifying means.

* * * * *